Sept. 5, 1939.  R. H. CROUCH  2,171,541
STRAIGHT LINE CUT-OFF SAW
Filed Oct. 28, 1936  4 Sheets-Sheet 4
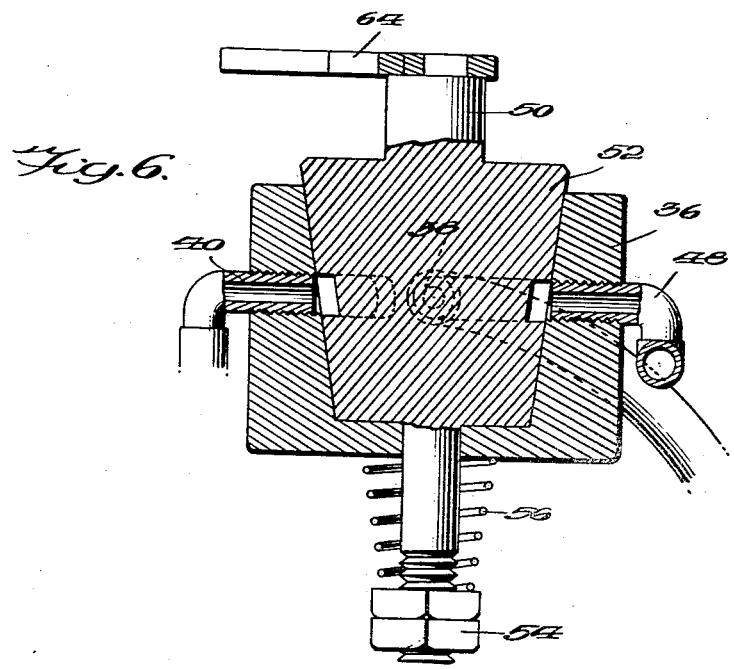
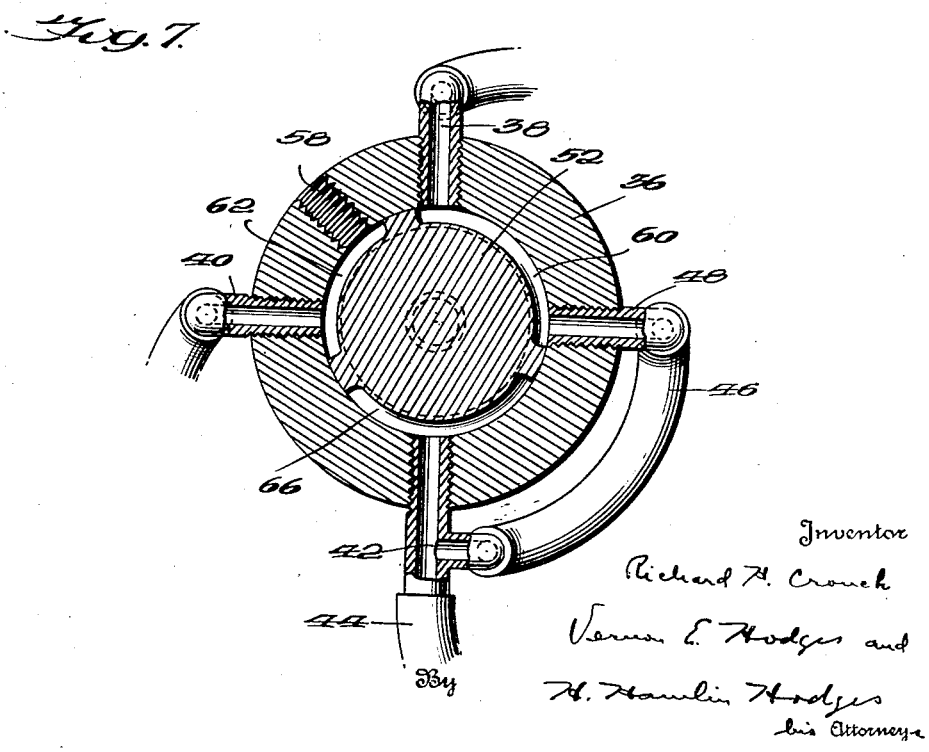

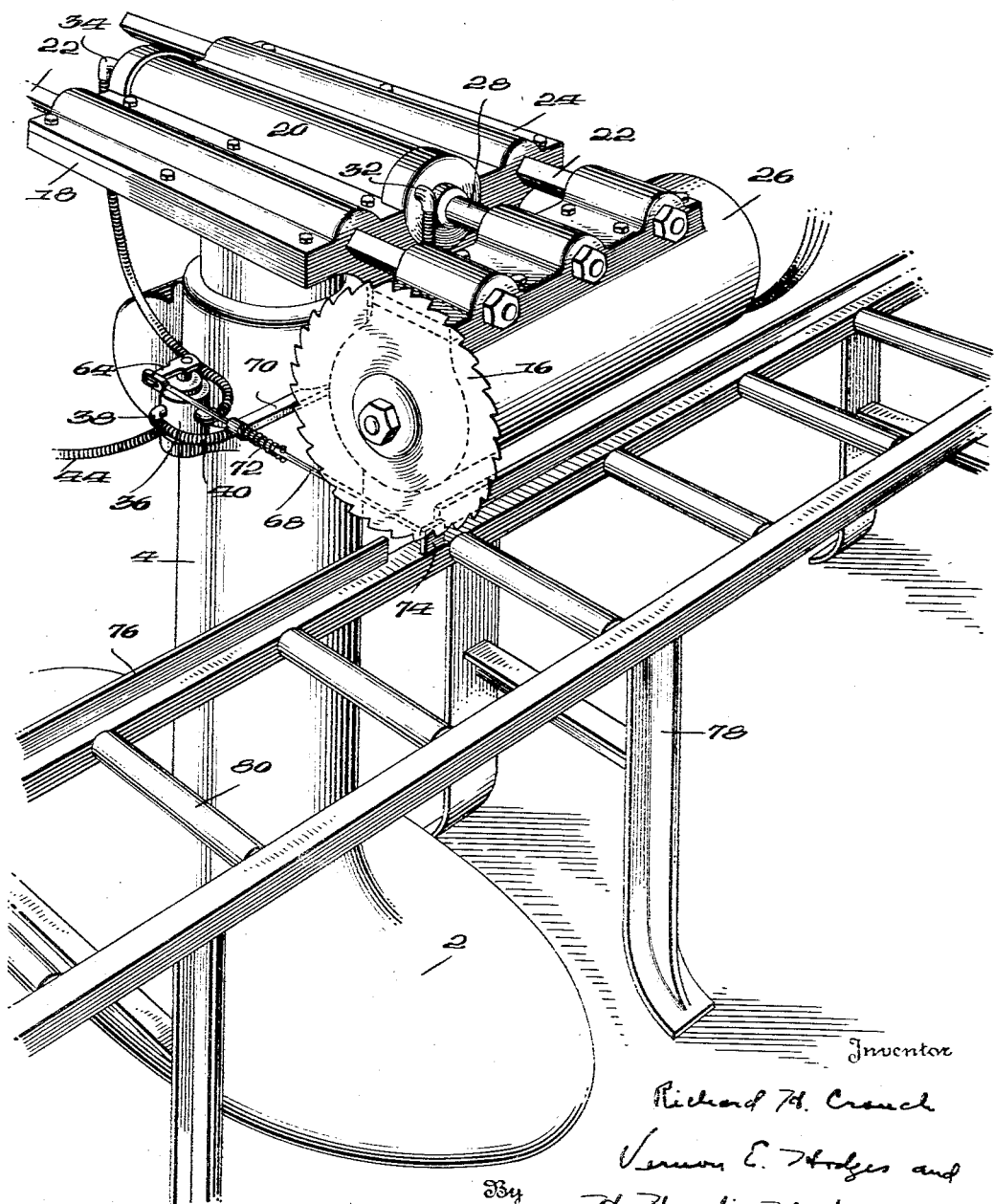

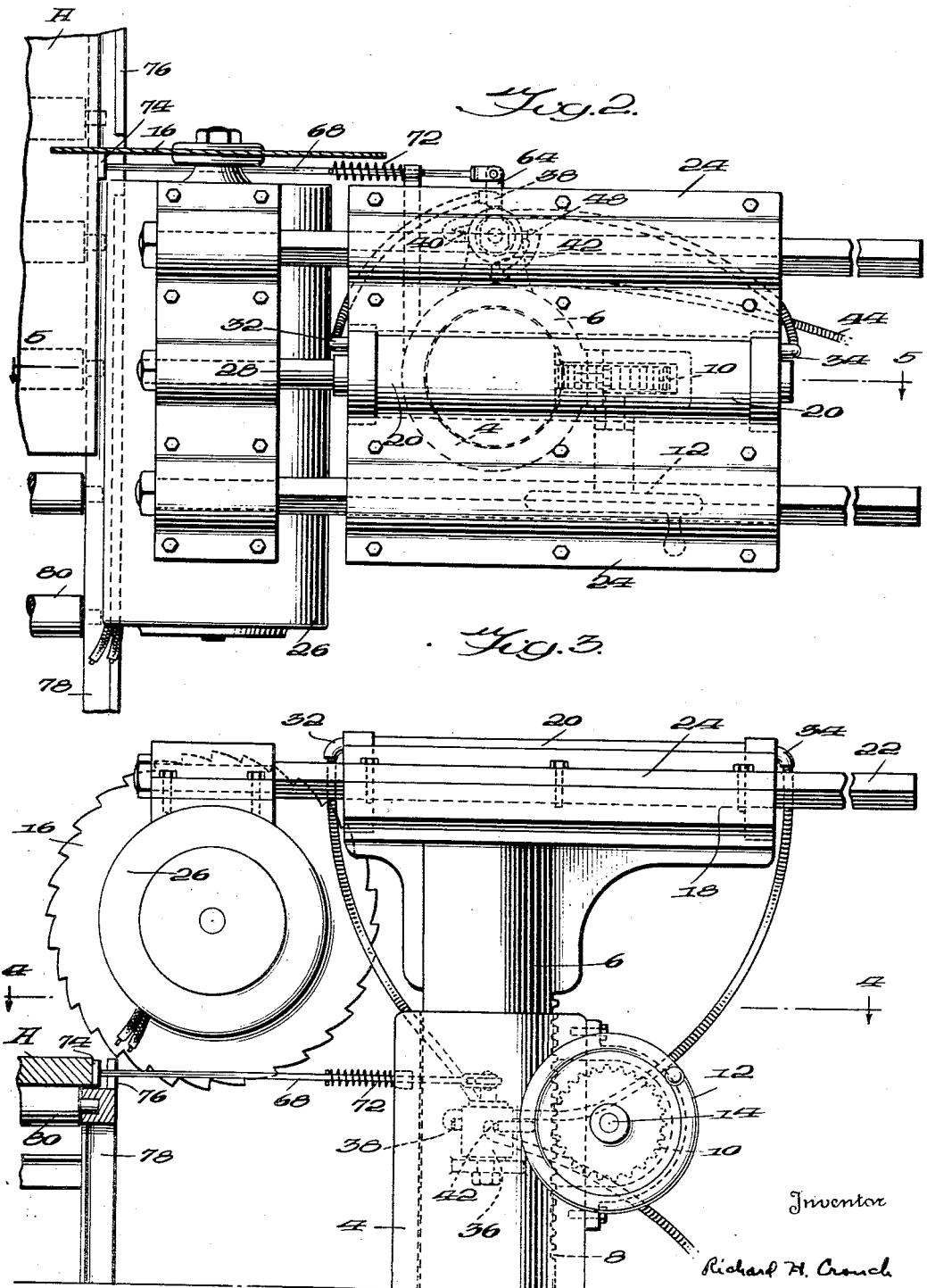

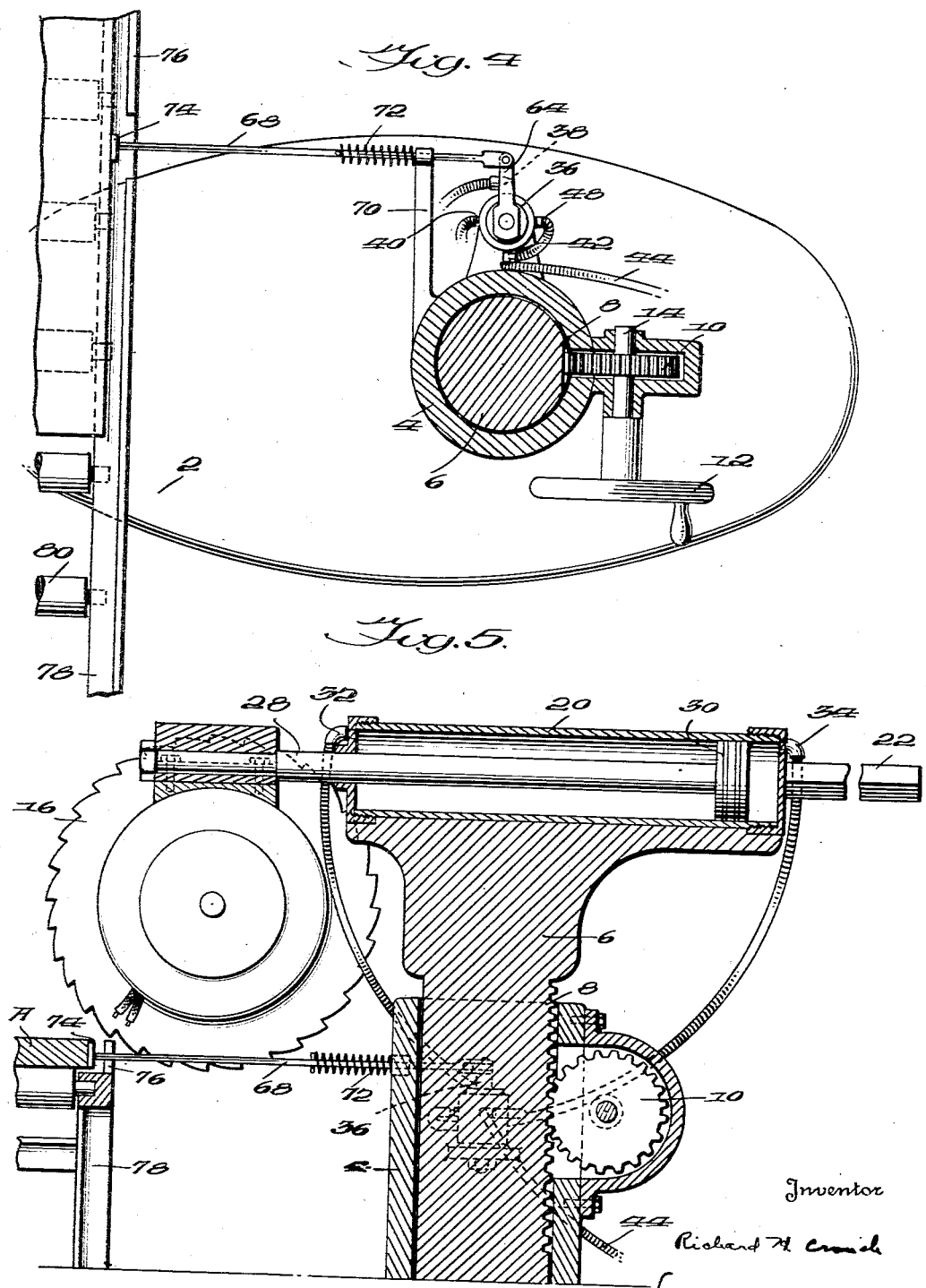

Patented Sept. 5, 1939

2,171,541

UNITED STATES PATENT OFFICE 2,171,541

STRAIGHT LINE CUT-OFF SAW

Richard H. Crouch, Pulaski, Va., assignor to Automatic Machinery Corporation, Pulaski, Va., a corporation of Virginia Application October 28, 1936, Serial No. 108,112

2 Claims. (Cl. 143—47)

My invention relates to an improvement in straight line cut-off saws.

Cut-off saws are, as the name implies, commonly used for cutting off lumber at predetermined points as the lumber is fed in from the source of supply to the saw which cuts desired lengths from the incoming piece of lumber. In the past, various devices have been used for regulating a circular saw which is positioned to cut off a piece of lumber after the lumber stock has been properly placed with relation to the saw disk.

It is an object of my invention to provide a cut-off saw which is pneumatically advanced and returned to its normal position after the lumber stock is placed in front of the saw disk and after the predetermined length of lumber has been cut from the original stock respectively, the control being effected by a four-way valve.

A further object of my invention is to provide a cut-off saw which is automatically controlled in its advancing and returning operations by the pressure of the lumber to be cut.

A still further object of my invention is to provide a cut-off saw which may be raised or lowered on its mountings so that the same mechanism may be utilized for cutting thin or thick lumber.

A still further object is to provide mechanism whereby the cut-off saw will be continually advanced to make its cut as long as the lumber to be cut is held against a trip by the saw as it cuts through the lumber.

In the accompanying drawings:

Fig. 1 is a perspective view;

Fig. 2 is a plan view;

Fig. 3 is an end elevation;

Fig. 4 is a horizontal cross-section on the line 4—4 of Fig. 3;

Fig. 5 is a vertical cross-section on the line 5—5 of Fig. 2;

Fig. 6 is a vertical cross-section through the four-way valve; and

Fig. 7 is a horizontal cross-section through the four-way valve.

The heavy base 2 is at its lower end relatively oblong in shape and has an upstanding pedestal 4 positioned nearer one end of the oblong, as shown more particularly in Fig. 4. The pedestal 4 is hollow and is adapted to receive a vertically movable post 6, which is provided on one side thereof with a rack 8. This rack 8 is engaged by the pinion 10 supported on one side of the pedestal 4, and adapted to be turned by the hand-wheel 12 which is mounted on the same shaft 14 on which the pinion 10 is secured. Thus, by rotating the hand-wheel 12, the pinion 10 will be turned, and the post 6 may be raised or lowered, carrying with it the saw disk 16 and its associated mechanism which will be more fully described.

On the upper end of the post 6, I provide a horizontally extending base 18, which base is adapted to position the cylinder 20 in the center thereof, and on each side thereof, to position the preferably square rods 22 which are held against the base 18 by the pillow-block bearings 24. These rods 22 are slidable longitudinally thereof through the bearing provided by the base 18 and the pillow-blocks 24.

A motor 26 is supported on the ends of the square rods 22, which motor is also supported by and may be moved laterally backward and forward by the piston rod 28, which connecting rod extends into the cylinder 20 and is provided on the end thereof remote from the motor 26 with a piston 30.

The cylinder 20 is provided at each end thereof with the ports 32 and 34 so that when air pressure or hydraulic pressure is applied through port 32, piston 30 will move to the position shown in Fig. 5, carrying with it the motor 26 and the saw disk 16 which is secured on the shaft of the motor. When air or hydraulic pressure is applied through the port 34, the piston rod 28 and its associated parts will be advanced or moved to the left, as shown in Fig. 5. The control of pressure, which is allowed to enter through either the port 32 or 34 is effected by a four-way valve, which is identified, generally, by the reference character 36. This four-way valve 36 is provided with a port 38 which is connected by a suitable pressure hose to the port 32 of the cylinder 20, and a port 40 which is likewise connected by a suitable hose to the port 34 of the cylinder 20. The port 42 of the four-way valve is connected to a pressure hose 44 which may come from any suitable constant source of supply of pressure, whether it be hydraulic pressure or air pressure. This port 42 is a T-port and is connected by a hose 46 with the port 48 entering one side of the four-way valve 36.

The four-way valve 36 is provided in the center thereof with a shaft 50 which extends therethrough and positions a truncated cone 52 in the tapering bore within the four-way valve 36. This shaft 50 extends through the four-way valve 36, and is held in position by the lock-nuts 54 bearing against the spring 56. The four-way valve is provided with an exhaust port 58 which, when air pressure is used, may be merely an exhaust into the open air, or it may be connected with a suitable exhaust pipe or hose if hydraulic pressure is to be used.

In the position in which the four-way valve is shown, air pressure from the hose 44 enters the port 42, passes through the hose 46 into the port 48, and through the channel 60 in the truncated cone 52, from whence it passes through port 38 and consequently through a suitable pressure hose to the port 32 of the cylinder 20. When the four-way valve is in this position, the channel 62 in the truncated cone 52 bridges the space between the port 40 and the exhaust port 58, so that the pressure within the cylinder 20 between the piston 30 and the port 34 may be forced through the connecting hose between the port 34 of the cylinder 20 and the port 40 of the four-way valve 36, and thus is allowed to escape through the exhaust port 58.

When it is desired that the piston 30 and the piston-rod 28 be advanced (to the left in Fig. 5) the shaft 50 is turned through approximately thirty degrees in a clockwise direction (as viewed in Fig. 4) by the arm 64. When this arm 64 has been turned, the channel 60 of the truncated cone 52 will be out of communication with the port 38, and the channel 62 will be out of communication with the port 40 and will come into registry with the port 38, it remaining in registry with the exhaust port 58. At the same time, the channel 66, which is at all times connected with the port 42, will now be in engagement with the port 40. Thus, pressure from the pressure hose 44 will enter the port 42, pass through the channel 66, through port 40, and the port 34 of the cylinder 20, and force the piston 30 and the piston rod 28 forward or to the left as shown in Fig. 5.

To operate this four-way valve 36, I connect a rod 68 to the arm 64, which rod 68 extends through the support 70 suitably secured to the pedestal 4. A spring 72 bears against the arm 70 and is adapted to maintain the rod 68 in the position in which it is shown. On the end of the rod 68 I provide a button 74, which, when the rod 68 is in its normal position is slightly out of alignment with the flange 76 upstanding on the side of the feed table 78. This feed table 78 is conventional in form, and is provided with a plurality of rollers 80 over which the lumber to be cut may readily be rolled to the cutting position.

The operation of my cut-off saw is as follows: A piece of lumber stock A is placed upon the rollers 80 of the table 78, and is advanced by the operator until the point at which it is to be cut off is in alignment with the saw-disk 16. At this time the lumber stock is pressed against the flange 76, and, consequently, against the button 74 on the end of the rod 68. By pressing the lumber against the button 74, rod 68 and arm 64 on the valve stem are forced back and the four-way valve 36 is turned so that pressure through the pressure hose 44 passes through the port 42, the channel 66, the port 40, and the port 34 into the cylinder 20, thus forcing the piston 30, piston-rod 28, and, consequently, the motor 26, and the saw-disk 16 to the left (as viewed in Fig. 5). At the moment this motion is commenced, the teeth on the saw-disk 16 will hold the lumber stock A against the button 74 and the flange 76, thus causing the pressure from the source of supply to advance the saw-disk 16 until it has passed entirely through the lumber stock A.

At the moment that the final cut has been made through the lumber stock A, the piece of lumber which has been cut off will no longer be held against the button 74 with sufficient force to overcome the energy of the spring 72, which has been compressed during the cutting operation, and, consequently, the spring 72 will return the rod 68 and the four-way valve 36 to its normal position.

When the four-way valve 36 is returned to its normal position, the air pressure from the pressure hose will pass through the port 42, connecting hose 46, port 48, through channel 60 to the port 38, from whence it passes through the connecting hose to the port 32 and forces the piston 30 to the position in which it is shown in Fig. 5. The pressure which has been within the cylinder 20, between the piston 30 and the port 34, is allowed to pass out through the port 34, port 40, and the channel 62 out through the exhaust port 58.

The speed at which the cut-off saw operates and the saw disk 16 is made to advance and retract is controlled entirely by the amount of pressure which is supplied to the four-way valve through the pressure hose 44.

Also, the length of the stroke of the saw disk 16 is dependent only upon the width of the lumber being cut, for as long as the saw disk is cutting, it will hold the stock A against the button 74 and the four-way valve will be held in position to allow pressure to pass through the port 34 into the cylinder 20 to continually advance the saw-disk (move it to the left as viewed in Fig. 5).

It is to be understood that when the cut-off saw is to be used, the electric motor 26 will be operating and the saw disk 16 will be revolving at any desired predetermined speed.

I claim:

1. A cut-off saw including an upstanding support, a piston and a plurality of longitudinally slidable rods extending horizontally from said support, a disk saw suspended on said rods and connected to said piston, a four-way valve supported on said upstanding support, and trip means for operating said valve, said trip means including a rod extending from an arm on said valve to a point approximately adjacent the disk saw and a head on said rod in the path of the material to be sawed when said material is in position to be cut, the material being moved laterally of said rod to engage and force the head and rod from their normal position to operate the valve.

2. A cut-off saw including an upstanding pedestal, a horizontal support on said pedestal, a plurality of longitudinally slidable rods supported by said horizontal support, a piston parallel to said rods, a disk saw supported on said rods and connected to said piston, a four-way valve mounted on said upstanding pedestal, and a rod extending from an arm on said valve to a point approximately adjacent said disk saw, said rod adapted to be moved by the material to be cut and to turn the valve to advance the disk saw.

RICHARD H. CROUCH.